No. 726,463. PATENTED APR. 28, 1903.
L. M. RICHARDSON.
ROLLER FOR ROLLER SKATES.
APPLICATION FILED MAY 7, 1902.
NO MODEL.

Witnesses:
M. Friel.
E. W. Hart

Inventor:
Levant M. Richardson
by Frank D. Thomason
Attorney.

THE NORRIS PETERS CO., PHOTO-LITHO., WASHINGTON, D. C.

UNITED STATES PATENT OFFICE.

LEVANT M. RICHARDSON, OF CHICAGO, ILLINOIS.

ROLLER FOR ROLLER-SKATES.

SPECIFICATION forming part of Letters Patent No. 726,463, dated April 28, 1903.

Application filed May 7, 1902. Serial No. 106,260. (No model.)

*To all whom it may concern:*

Be it known that I, LEVANT M. RICHARDSON, a citizen of the United States, and a resident of Chicago, in the county of Cook and State of Illinois, have invented certain new and useful Improvements in Rollers for Roller-Skates, of which the following is a full, clear, and exact description.

My invention relates to rollers or casters which are particularly adapted for use in connection with roller-skates; and its object is to provide a simple, cheap, and durably-constructed roller possessing all the advantages of a solid aluminium wheel, together with the cheapness and lightness of a composition roller. This I accomplish by the means hereinafter fully described and as particularly pointed out in the claims.

Figure 1:
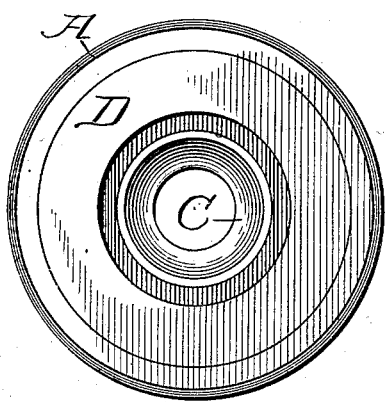
Figure 2:
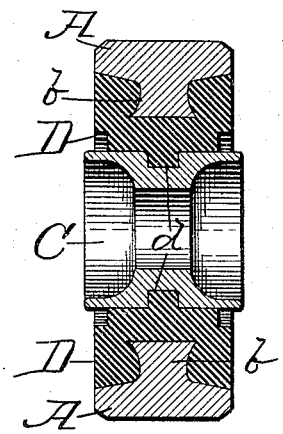
Figure 3:
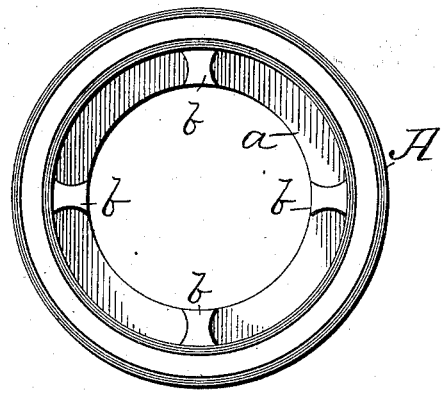
Figure 4:
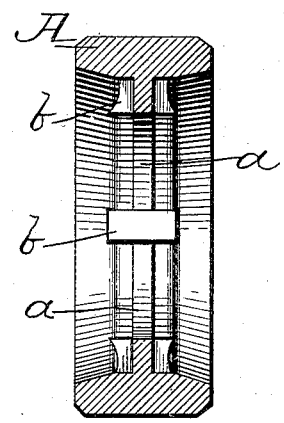

In the drawings, Figure 1 is a side view of my invention drawn to an enlarged scale. Fig. 2 is a transverse central section of the same. Fig. 3 is a side view of the aluminium rim of the wheel. Fig. 4 is a transverse central section of the same.

In the drawings, A represents the metal rim of my improved roller, which is preferably made of aluminium. The outer surface or tread of this rim is cylindrical and has its end edges preferably beveled. The inner circumference of this rim is provided at its center of width with an inwardly-projecting circumferential bead $a$, which at equal intervals apart are intersected with, say, four cross-bars $b\ b\ b\ b$. These cross-bars preferably do not project farther inward than the inner circumference of said bead $a$, but extend laterally to either side of the same to points about midway between said bead and the plane of the side edges of the rim and preferably have their ends concaved or undercut.

The center of the roller comprises a suitable steel core C, which in the roller shown in the drawings is concaved at each end to provide ball-bearing cup and has its outer circumference made cylindrical with the exception of a circumferential groove $d$ of sufficient dimension midway its ends.

In making the roller the rim is placed concentric to the bearing, and the space between the two is filled in with plastic composition D, which when dried solidifies and hardens and makes a solid wheel from circumference to core. The bead $a$ and cross-bars $b$ thoroughly and securely anchor the rim in the composition D, and the composition by surrounding the core C and entering the circumferential groove $d$ thereof retains said core in its proper place beyond possibility of displacement. Either the bead $a$ or the cross-bars $b$ may be dispensed with; but I much prefer the use of both. The bead $a$ is designed to prevent lateral displacement of the relative positions of the rim and composition, and the cross-bars effectually prevent the remote possibility of the rim creeping on the same. Any means that would effect this result would come within the scope of my invention.

What I claim as new is—

1. A roller or caster comprising a metallic core, a metallic rim having a circumferential bead projecting from its inner circumference and provided with cross-bars having concave ends at intervals along its length, and a composition interposed between said core and rim in which the said bead and cross-bars are embedded.

2. A roller or caster comprising a metallic core having a circumferential groove in its outer circumference, a metallic rim having its inner circumference provided at intervals with cross-bars the ends of which are concaved, and a composition interposed between said core and rim, substantially as and for the purposes set forth.

3. A roller or caster comprising a metallic core having a circumferential groove in its outer circumference, a metallic rim having a circumferential bead projecting inward from its inner circumference, a plurality of cross-bars extending outwardly from said bead and having their edges beveled, and a composition interposed between said core and rim, substantially as and for the purposes set forth.

4. A roller or caster comprising a metallic core a metallic rim having a circumferential bead projecting from its inner circumference and provided with cross-bars at intervals along its length, and a composition interposed between said core and rim in which the bead and the bars of the latter are embedded.

5. A roller or caster comprising a metallic core having a circumferential groove in its outer circumference a metallic rim having a circumferential bead with cross-bars thereon projecting inward from its inner circumference, and a composition interposed between said core and rim, substantially as and for the purpose set forth.

6. A roller or caster comprising a metallic core having a circumferential groove in its outer circumference, a metallic rim having its inner circumference provided at intervals with cross-bars, and a composition interposed between said core and rim, substantially as and for the purpose set forth.

LEVANT M. RICHARDSON.

Witnesses:
FRANK D. THOMASON,
M. FRIEL.